United States Patent [19]

Meyers et al.

[11] 4,143,776
[45] Mar. 13, 1979

[54] APPARATUS FOR TRANSFERRING AND TURNING OVER PARTS

[75] Inventors: Richard H. Meyers; Dennis L. White, both of Rockford, Ill.

[73] Assignee: Mattison Machine Works, Rockford, Ill.

[21] Appl. No.: 816,435

[22] Filed: Jul. 18, 1977

[51] Int. Cl.² ............................................. B65G 47/90
[52] U.S. Cl. .................................... 414/735; 198/344; 198/403; 198/486; 414/567; 414/309; 414/739; 414/763; 414/773
[58] Field of Search ................ 214/1 BD, 1 BV, 1 Q, 214/91 R, 147 T, 151, 301, 1 BB, 1 BT, 1 BH, 1 BC; 198/344, 403, 486

[56] References Cited

U.S. PATENT DOCUMENTS 3,490,575  1/1970  Herrmann ..................... 214/1 BC X
4,057,149  11/1977  Clarke ............................ 214/1 Q X Primary Examiner—Francis S. Husar
Assistant Examiner—George F. Abraham
Attorney, Agent, or Firm—Leydig, Voit, Osann, Mayer & Holt, Ltd.

[57] ABSTRACT

A transfer mechanism places one part in a fixture on a continuously rotating table and substantially simultaneously picks up another part from an adjacent fixture on the table. The transfer mechanism then places the picked-up part on one fixture of an intermittently rotatable table while substantially simultaneously picking up another part on the latter table preparatory to placing that part on the continuously rotating table. A turn over mechanism subsequently picks up the part placed on the intermittently rotatable table by the transfer mechanism, turns the part over, and replaces the part on the intermittently rotatable table preparatory to the part being picked up from the latter table and returned to the continuously rotating table by the transfer mechanism.

19 Claims, 21 Drawing Figures

| ROD CODE | |
|---|---|
| ①—o  RAW ROD | ③—o  GROUND FIRST SIDE TURNED OVER |
| ②—o  GROUND FIRST SIDE | ④—o  FINISHED ROD |

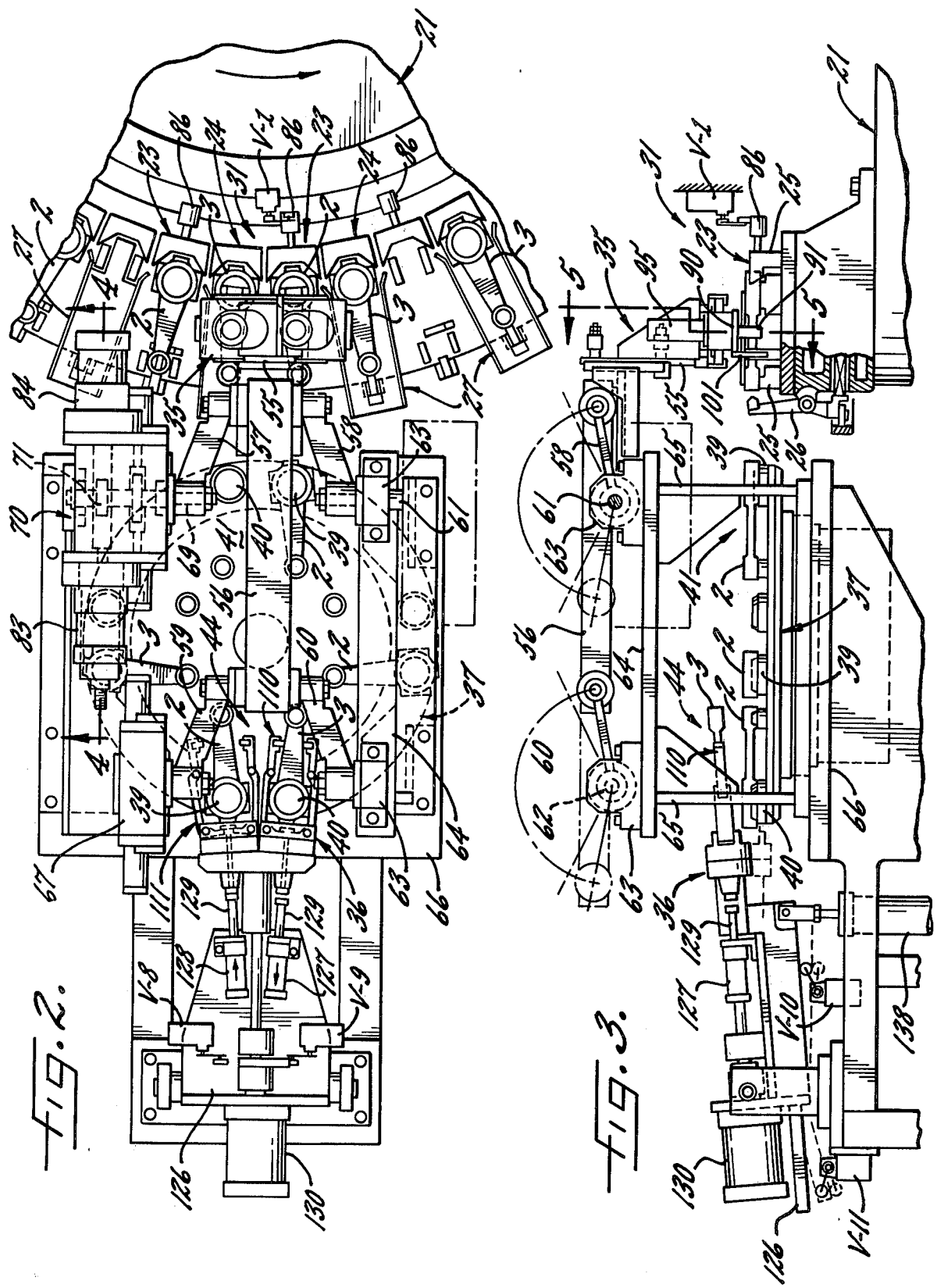

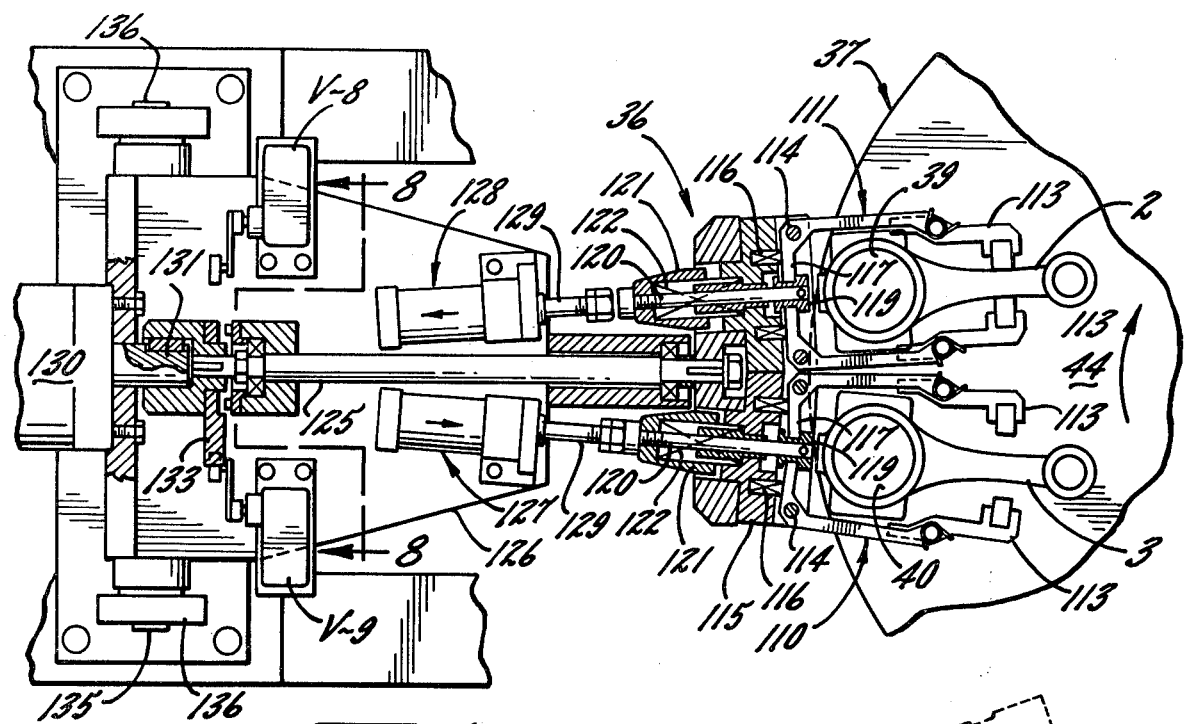
Fig. 7.
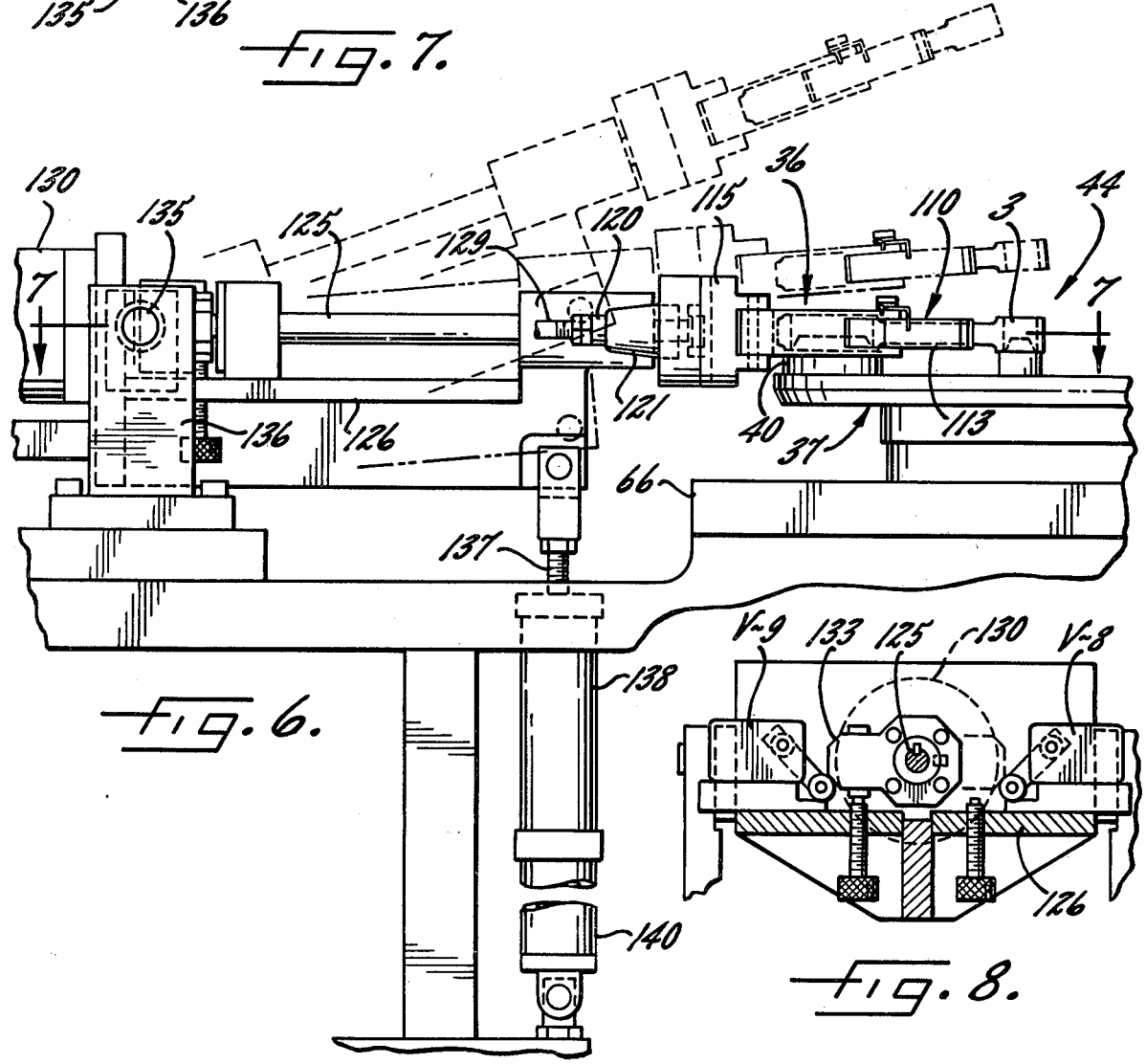
Fig. 6.
Fig. 8.

APPARATUS FOR TRANSFERRING AND TURNING OVER PARTS

BACKGROUND OF THE INVENTION

This invention relates to apparatus for handling parts and, more particularly, to apparatus for transferring parts and for turning the parts over. The invention has more specific reference to apparatus in which parts are loaded into fixtures on a continuously moving table and are carried around by the table while an operation such as a machining operation is being performed on the parts. Subsequently, each part is turned over on the table and again is carried around by the table so that the operation can be performed on the other side of the part.

SUMMARY OF THE INVENTION

One of the aims of the present invention is to provide apparatus of the foregoing type having a new and improved transfer mechanism which is capable of loading parts into and/or unloading parts from the fixtures of the table while the latter is rotating with continuous motion.

A further object is to provide a transfer mechanism having one or more part holders which are uniquely mounted to enable the holders to track the continuously moving fixtures and to load parts into and/or unload parts from the fixtures while the latter are moving.

Another object of the invention is to provide a transfer mechanism having a first holder which places a part in a fixture on the table and having a second holder which substantially simultaneously picks up a part from an adjacent fixture.

Still another object is to provide a transfer mechanism in which the second holder releases its picked-up part at a receiving area spaced from the table while the first holder substantially simultaneously picks up a part in the receiving area preparatory to delivering the part to and placing the part on the table.

An additional object of the invention is to provide apparatus having an intermittently rotatable index table which receives parts from and supplies parts to the transfer mechanism at the receiving area and which indexes the received parts to a turning area where the parts are turned over preparatory to being returned to the continuously movable table by the transfer mechanism.

Another object is to provide apparatus in which unique turn over apparatus is located in the turning area and picks up each part indexed into the turning area, re-orients such part and replaces the part on the index table preparatory to the part being indexed to the receiving area and picked up by the transfer mechanism for return to the continuously movable table.

One aspect of the invention, therefore, resides in the provision of apparatus in which a transfer mechanism, an index table and a turn over mechanism coact in a novel manner to automatically unload parts from the continuously moving table, turn the parts over and re-load the parts on the continuously movable table.

The invention also resides in the unique construction of the transfer mechanism to enable the latter to operate in timed relation with both the continuously movable table and the intermittently movable index table and in the unique construction of the turn over mechanism to enable the latter to pick up a part from the index table and replace the part in the proper position on the index table after turning the part over.

These and other objects and advantages of the invention will become more apparent from the following detailed description when taken in conjunction with the accompanying drawings.

BRIEF DESCRIPTION OF THE DRAWINGS

FIG. 2 is an enlarged plan view, in structural form, of part of the apparatus shown in FIG. 1.

FIG. 3 is a fragmentary side elevational view of the apparatus shown in FIG. 2.

FIG. 6 is an enlarged side elevational view of the index table and the turn over mechanism shown in FIG. 3.

FIG. 7 is a fragmentary cross-section taken substantially along the line 7—7 of FIG. 6.

FIG. 8 is a fragmentary cross-section taken substantially along the line 8—8 of FIG. 7.

DETAILED DESCRIPTION OF THE PREFERRED EMBODIMENT

General Organization Of The Apparatus

Figures 1, 1A:
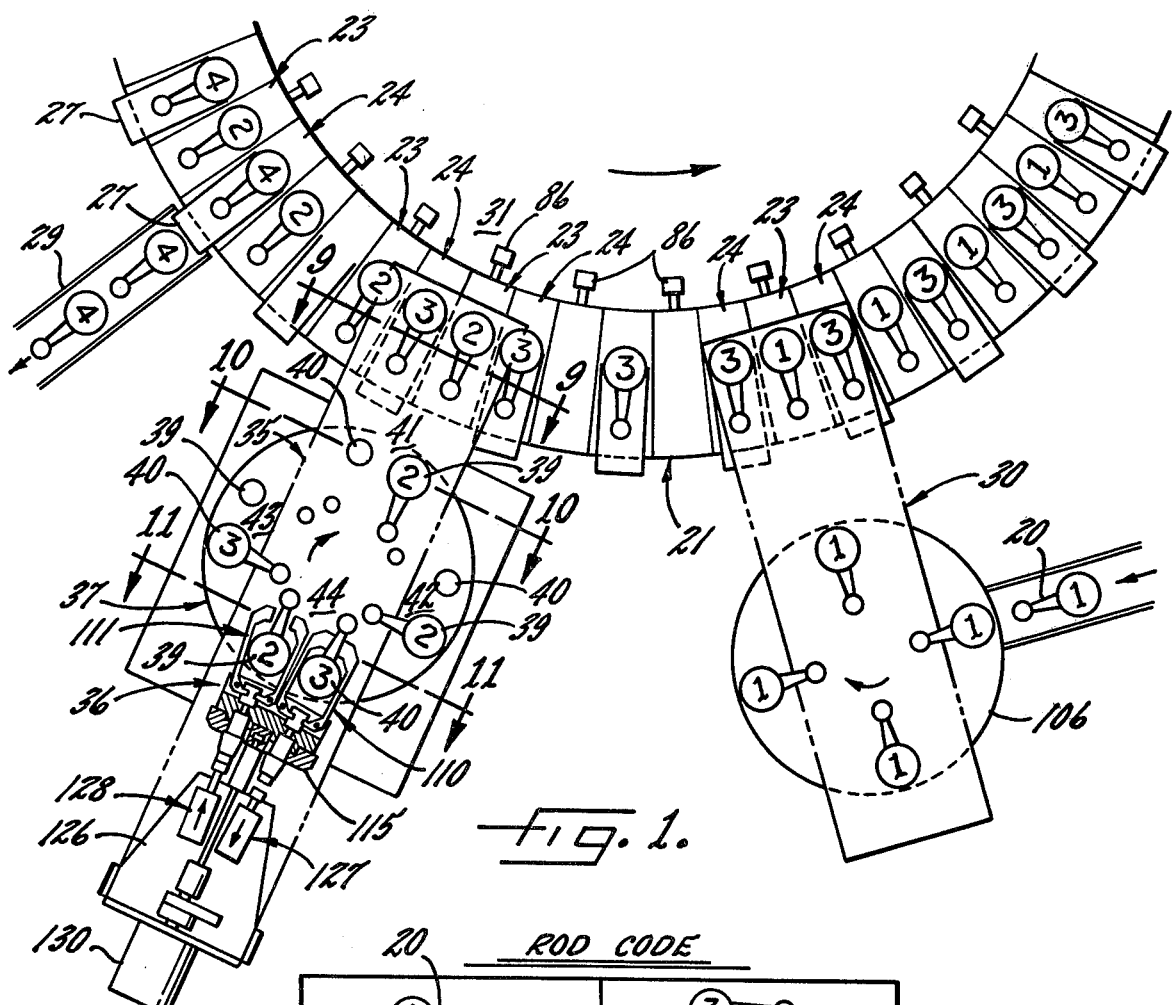
FIG. 1 is a top plan view, in diagrammatic form, showing new and improved parts handling apparatus incorporating the unique features of the present invention.
FIG. 1a is word-number code which indicates the condition of the various parts shown in FIG. 1.

As shown in the drawings for purposes of illustration, the invention is incorporated in apparatus for handling and transferring parts 20 (FIG. 1a) which, in the present instance, are shown as being connecting rods of the type used in internal combustion engines. The handling and transfer apparatus is associated with a surface grinding machine (not shown) which serves to rough and/or finish grind the upper and lower sides of each rod. The grinding machine includes a horizontal table 21 (FIG. 1) which is adapted to be rotated continuously and in a counterclockwise direction about an upright axis at a rate of about 0.7 RPM and which carries the rods beneath the grinding wheels (not shown) of the grinding machine.

To accurately support the rods 20 during the grinding operation, the grinding table 21 includes a series of part carriers or fixtures 23 and 24 which are spaced angularly around the upper side of the table, the fixtures 23 alternating with the fixtures 24 around the table. Each fixture 23, 24 is of conventional construction and includes a number of locating blocks 25 (FIG. 3) and a clamping device 26. The latter is automatically actuated in a conventional manner to clamp the rod after the rod has been loaded into the fixture and to unclamp the rod just before the rod is unloaded. The fixtures 23 differ from the fixtures 24 in that each of the latter fixtures includes a pivoted flipper tray 27 which underlies the rod. When the grinding operation is completely finished, the trays are automatically pivoted upwardly and outwardly to flip the rods out of the fixtures 24 and onto a discharge conveyor 29 (FIG. 1) located alongside the table 21.

In the operation of the grinding machine, raw rods (i.e., rods with neither side ground and indicated by the number 1) are delivered to each of the fixtures 23 by a loading mechanism 30 (FIG. 1) whose construction and operation will be described subsequently. As the table 21 rotates, the raw rods 1 are carried beneath the grinding wheels and are ground on their first or upper sides. Those rods whose upper sides have been ground and are facing upwardly are indicated throughout the drawings by the number 2. As each rod 2 passes from beneath the grinding wheels and enters a loading-unloading area 31 (hereinafter simply called the loading area), the rod is removed from its fixture 23 and is subsequently turned upside down and re-loaded into one of the fixtures 24. The number 3 is used throughout the drawings to designate each rod which has one ground side and which has been turned over so that its unground side is facing upwardly.

After the rod 3 has been placed into the fixture 24 at the loading area 31, the rod is rotated idly past the loading mechanism 30 and again is carried beneath the grinding wheels so that the second side of the rod may be ground. Rods having two ground sides are indicated by the number 4 and such rods are flipped out of the fixtures 24 and into the discharge conveyor 29 after the rods have passed from beneath the grinding wheels.

The Invention In General

The present invention contemplates the provision of a new and improved transfer mechanism 35 for automatically unloading rods 2 from the table 21 and re-loading rods 3 onto the table at the loading area 31 and further contemplates a new and improved turn over mechanism 36 which turns over the rods 2 unloaded by the transfer mechanism 35 and which supplies turned-over rods 3 to the transfer mechanism for re-loading onto the table. An index table 37 is located between the transfer mechanism 35 and the turn over mechanism 36 and coacts uniquely with those two mechanisms in effecting unloading, turning and re-loading of the rods.

The Index Table

The index table 37 is spaced outwardly from the grinding table 21 and is located adjacent the loading area 31 of the grinding table. The index table also is disposed in a horizontal plane and is adapted to be rotated intermittently and in a clockwise direction about an upright axis and through steps of ninety degrees. Spaced around the upper side of the index table are four pairs of angularly spaced carriers or fixtures 39 and 40 which are adapted to support the rods during the time the rods are unloaded from the table 21 for turning. The fixtures 39 and 40 of each pair are identical to one another and each includes a large locator and a small locator, the locators being adapted to fit into the holes in the end portions of the rods.

Each time the index table 37 dwells, one pair of fixtures 39 and 40 is positioned in a receiving area 41 (FIG. 1) which is located outwardly of the loading area 31 of the grinding table 21. At the particular time the dwell condition shown in FIG. 1 is prevailing, a rod 2 is located on the leading fixture 39 of the pair in the receiving area, that rod having been unloaded from the grinding table 21 and placed on the fixture by the transfer mechanism 35. When the table 37 is rotated clockwise through a first step, the rod 2 on the fixture 39 is indexed to an idle station 42 (FIG. 1). At the same time, the following pair of fixtures 39 and 40 is indexed from an idle station 43 to the receiving area 41, there being a turned-over rod 3 on the trailing fixture 40 of that pair.

When the table 37 next dwells, the transfer mechanism 35 picks up the rod 3 from the trailing fixture 40 dwelling in the receiving area 41 and substantially simultaneously places a rod 2 on the leading fixture 39 of the pair in the receiving area. Upon the second index of the table, the rod 2 in the idle station 42 is moved from that station to a turning area 44 (FIG. 1) located adjacent the turn over mechanism 36. During the dwell period, the turn over mechanism 36 picks up the rod 2 from the leading fixture 39 in the turning area. At about the same time, the turn over mechanism places a rod 3 on the trailing fixture 40 dwelling in the turning area. It should be pointed out here that the latter rod 3 previously was a rod 2 which was indexed into the turning area 44 on the leading fixture 39 of the pair immediately preceding the pair presently dwelling in the turning area.

The table 37 then is indexed through another step. During this index, the turn over mechanism 36 turns over the rod 2 which was picked up so that this rod thus becomes a rod 3. Also, the rod 3 placed on the trailing fixture 40 of the pair in the turning area 44 is indexed to the idle station 43, the rod 3 on the trailing fixture in the idle station 43 is indexed to the receiving area 41, the rod 2 on the leading fixture 39 in the receiving area 41 is indexed to the idle station 42, and the rod 2 on the leading fixture in the idle station 42 is indexed to the turning area 44. The table 37 then dwells while the transfer mechanism 35 picks up the rod 3 on the trailing fixture 40 in the receiving area 41 and places a rod 2 on the leading fixture 39 in the receiving area. At the same time, the turn over mechanism 36 picks up the rod 2 from the leading fixture 39 of the pair dwelling in the turning area 44 and places the previously picked up and turned-over rod 3 on the trailing fixture 40 of that pair.

To summarize, the transfer mechanism 35, during each dwell period of the index table 37, places a rod 2 from the grinding table 21 on the leading fixture 39 of the pair in the receiving area 41 and picks up a turned-over rod 3 from the trailing fixture 40 of that pair. At the same time, the turn over mechanism 36 places a turned-over rod 3 on the trailing fixture 40 of the pair dwelling in the turning area 44 and picks up a rod 2 from the leading fixture 39 of that pair. As the table 37 indexes, the transfer mechanism 35 loads the picked-up rod 3 into one of the fixtures 24 on the grinding table 21 and picks up a rod 2 from one of the fixtures 23 for delivery to the leading fixture 39 of the two fixtures which next dwell in the receiving area 41. During this time, the turn over mechanism 36 turns over its picked-up rod preparatory to placing this rod —as a rod 3— on the trailing fixture 40 of the two fixtures which next dwell in the turning area 44.

The Transfer Mechanism

The transfer mechanism 35 is characterized by its ability to unload rods 2 from and place rods 3 in the fixtures 23 and 24, respectively, as the fixtures are rotated through the loading area 31 with continuous motion by the grinding table 21. In addition, the transfer mechanism is characterized by its ability to move the rods between the grinding table 21 and the index table 37 in a smooth vertical arc rather than moving the rods with a start-stop motion along distinct vertical and horizontal paths.

More specifically, the transfer mechanism 35 includes first and second rod holders 50 and 51 (FIG. 5) disposed side-by-side with one another, the holder 50 being used to pick up a rod 2 in one of the fixtures 23 moving through the loading area 31 of the grinding table 21 and to place such rod on the leading fixture 39 of the pair dwelling in the receiving area 41 of the index table 37. The rod holder 51 serves to pick up a rod 3 from the trailing fixture 40 of the pair in the receiving area 41 and to place that rod in one of the fixtures 24 moving through the loading area.

Both rod holders 50 and 51 are carried on the lower end of a vertical head 55 (FIG. 5) which, in keeping with the invention, is mounted so as to casue the holder 50 to move upwardly, outwardly and then downwardly in a substantially vertical arc as the holder 50 travels from the loading area 31 to the receiving area 41 and transfers a rod 2 from the grinding table 21 to the index table 37. The mounting of the head 55 also causes the holder 51 to move upwardly, inwardly and then downwardly along the same vertical arc as the holder 51 travels from the receiving area 41 to the loading area 31 and transfers a rod 3 from the index table to the grinding table.

For these purposes, the upper end of the head 55 is connected rigidly to the outer end of a horizontal beam 56 (FIGS. 2 and 3) which is disposed above the index table 37 and which is connected pivotally at its inner end to the upper ends of a pair of inner links 57 and 58 and at its outer end to the upper ends of a pair of outer links 59 and 60, the links and the beam forming a parallelogram linkage. The lower ends of the links 58 and 60 are connected rigidly to shafts 61 and 62 (FIG. 3) which are journaled in bearings 63 supported on a horizontal rail 64. The rail is mounted on posts 65 extending upwardly from a base 66 which also supports the turning mechanism 36 and the index table 37. Another bearing 67 (FIG. 2) is supported on the base 65 and above the index table and journals a shaft (not visible) which is rigidly connected to the lower end of the link 59. The lower end of the link 57 is connected rigidly to another shaft 69 which is adapted to be turned back and forth by a drive mechanism 70. When the shaft 69 is turned counterclockwise (FIG. 4), the links 57 to 60 pivot counterclockwise and move the head 55 upwardly, outwardly and then downwardly from the loading area 31 to the receiving area 41 along a substantially vertical arc while keeping the head constantly disposed in an upright position. Clockwise turning of the shaft 69 results in reverse pivoting of the links so that the head travels reversely along the same arc and moves from the receiving area to the loading area.

Figure 4:
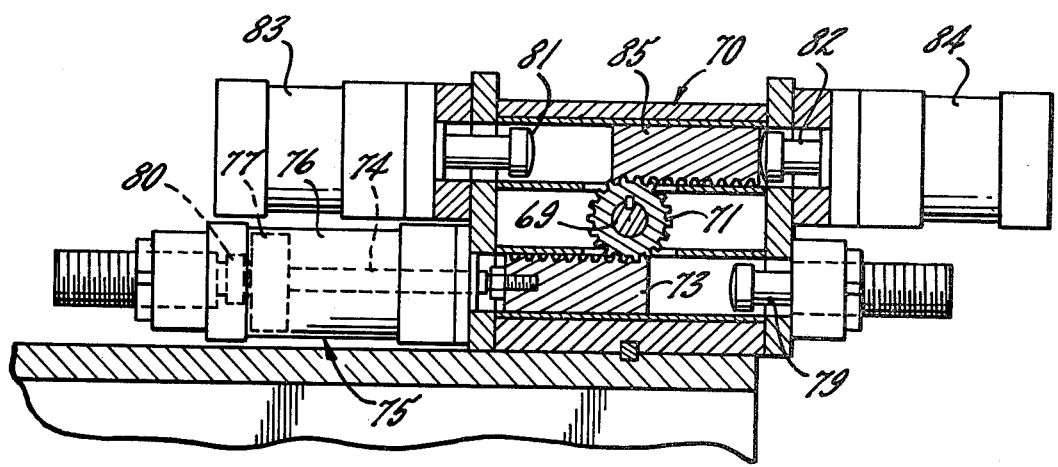
FIG. 4 is an enlarged fragmentary cross-section taken substantially along the line 4—4 of FIG. 2.

The drive mechanism 70 is shown in FIG. 4 and is supported on the base 66 and above the index table 37. Herein, the drive mechanism comprises a pinion 71 which is keyed to the shaft 69 of the link 57 and which is adapted to be turned back and forth in response to reciprocation of a rack 73. The latter is attached to the rod 74 of a pneumatic actuator 75 having a cylinder 76 and having a piston 77 telescoped into the cylinder and connected to the rod. When pressurized air is admitted into the head end of the cylinder, the rack 73 is shifted from left to right (FIG. 4) to turn the pinion 71 counterclockwise and effect outward movement of the head 55 from the loading area 31 to the receiving area 41. As the head moves into the receiving area, the free end of the rack engages an air-loaded bumper 79 which causes the head to decelerate smoothly during its final movement into the receiving area.

Similarly, the rack 73 is shifted from right to left when pressurized air is admitted into the rod end of the cylinder 76, such shifting resulting in clockwise turning of the pinion 71 and effecting inward movement of the head 55 from the receiving area 41 to the loading area 31. An air-loaded bumper 80 engages the piston 77 as the head moves into the loading area and slows the head during its final movement.

Means are provided to insure that the head 55 moves into the loading area 31 and the receiving area 41 in precisely timed relation with the movement of the grinding table 21 and the index table 37, respectively. In the present instance, these means comprise first and second plungers 81 and 82 (FIG. 4) connected to the rods of pneumatic actuators 83 and 84 and adapted to engage opposite ends of a rack 85 which meshes with the upper side of the pinion 71. When the actuator 75 is first operated to shift the head 55 outwardly from the loading area 31 to the receiving area 41, the plunger 81 is in an extended position and the plunger 82 is in a retracted position as shown in FIG. 4. The index table 37 is indexing as the head 55 moves outwardly and, during such movement, the rack 85 is shifted from right to left by the pinion 71. If the index table 37 has not stopped by the time the rack 85 reaches the extended plunger 81, the rack engages the plunger and stops movement of the head 55 with the holders 50 and 51 positioned just above the index table. When the index table subsequently completes its index and stops, the pressurized air in the actuator 83 is released automatically (in a manner to be explained subsequently) to allow the plunger 81 to retract, to enable the rack 85 to continue its right to left movement and to permit the head 55 to move downwardly toward the index table. Normally, the index table will stop and effect retraction of the plunger 81 before the latter is engaged by the rack 85. The plunger does, however, insure that the head will not make its final downward movement into the receiving area 41 until the index table is fully stopped and thus the plunger prevents the head and the index table from colliding with one another.

The plunger 82 acts in a somewhat similar manner to cause the head 55 to move downwardly into the loading area 31 in properly timed relation with the movement of each pair of adjacent fixtures 23 and 24 into the loading area. When the head first moves from the receiving area 41 toward the loading area 31, the plunger 82 is held in an extended position by the actuator 84. If the right end of the rack 85 engages the plunger 82 before a dog 86 (FIGS. 2 and 3) carried by the fixture 23 moving into the loading area 31 actuates a stationarily mounted control valve V-1, the plunger stops the head 55 and prevents the head from moving downwardly. Once the fixtures 23 and 24 are properly positioned in the loading area, the dog engages and actuates the control valve so as to cause the air in the actuator 84 to be released. The plunger 82 thus is allowed to retract and permits the rack 85 to continue its left to right movement so that the head 55 may move downwardly to enable the holders 50 and 51 to pick up a rod 2 from the fixture 23 and to place a rod 3 in the fixture 24. Normally, the plunger 82 will momentarily stop the head each time the head approaches the loading area since it is essential that a precisely timed relationship be maintained between the heead and the continuously movable fixtures 23 and 24. In other words, the head normally will arrive at the stop position before the dog 86 on the fixture 23 actuates the control valve V-1, and the head will wait at the stop position until the fixtures 23 and 24 move into the proper position in the loading area 31.

The control valve V-1 (and other similar valves to be referred to subsequently) is operable, when actuated, to produce a pressure signal which, in the case of the valve V-1, controls the admission of pressurized air to the actuator 84. A similar control valve (not shown) is associated with the index table 37 and is released each time the index table dwells. Release of that valve results in a pressure signal which effects operation of the actuator 83 to retract the plunger 81.

In accordance with an important aspect of the invention, the holders 50 and 51 are mounted on the head 55 to move horizontally and to horizontally track the fixtures 23 and 24, respectively, as the latter move through the loading area 31. As a result, the holder 50 moves horizontally along with the continuously moving fixture 23 as the holder picks up a rod 2 from the fixture. In addition, the holder 51 moves horizontally along with the continuously moving fixture 24 as the holder places a rod 3 in the fixture and thus the rod 3 is loaded into the fixture with a smooth and gradual motion rather than being slapped straight downwardly into the fixture.

Herein, the two rod holders 50 and 51 are supported on a slide 90 (FIG. 5) which, in turn, is supported and guided by the lower end portion of the head 55 to move horizontally relative to the head and along the same general path as is followed by the fixtures 23 and 24 as the fixtures move through the loading area 31. Each of the holders 50 and 51 includes a pair of jaws 91 which are pivotally mounted on the slide at 93 to swing between open and closed positions. When the jaws of each pair are closed, the lower end portions of the jaws clamp against the sides of a connecting rod while fingers 94 on the lower ends of the jaws underlie the rod to provide positive control over the rod. As the jaws pivot to their open positions, the rod is unclamped and the fingers move from beneath the rod to enable the latter to be released from the jaws.

Figure 5:
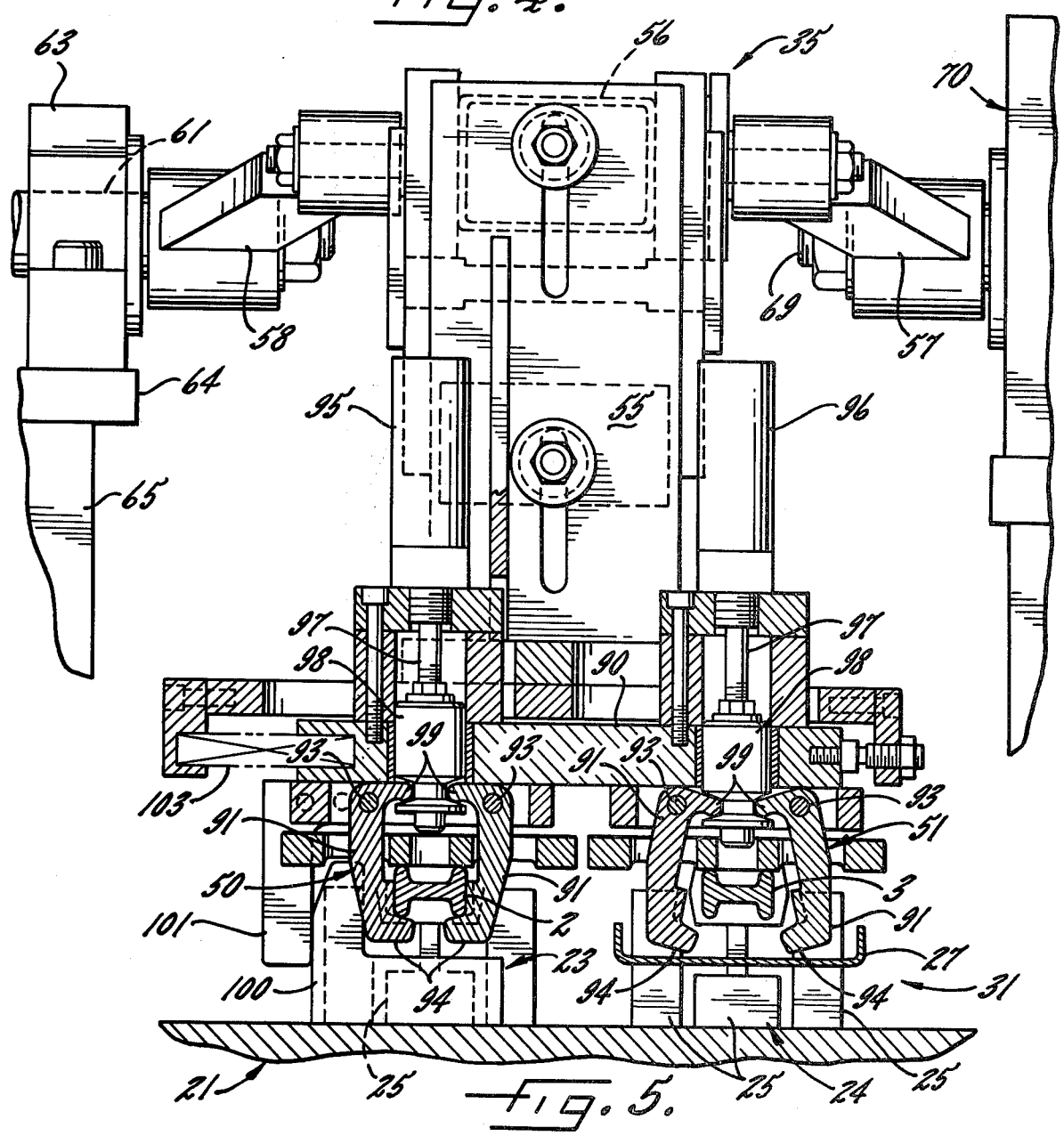
FIG. 5 is an enlarged fragmentary cross-section taken substantially along the line 5—5 of FIG. 3.

To swing the jaws 91 of the holders 50 and 51 between their open and closed positions, two pneumatic actuators 95 and 96 (FIG. 5) are supported on the slide 90 and are operably connected to the holders 50 and 51, respectively. As shown in FIG. 5, each actuator includes a reciprocating rod 97 whose lower end is connected to a spool 98. Each spool is guided for up and down movement in the slide 90 and is formed with a circumferentially extending groove which receives ears 99 on the upper end portions of the jaws 91. When the rod 97 of the actuator 95 or 96 is extended downwardly, the jaws of the respective holder 50 or 51 are pivoted from their closed positions to their open positions. Upward retraction of the rod 97 effects closing of the associated pair of jaws.

Figure 9:
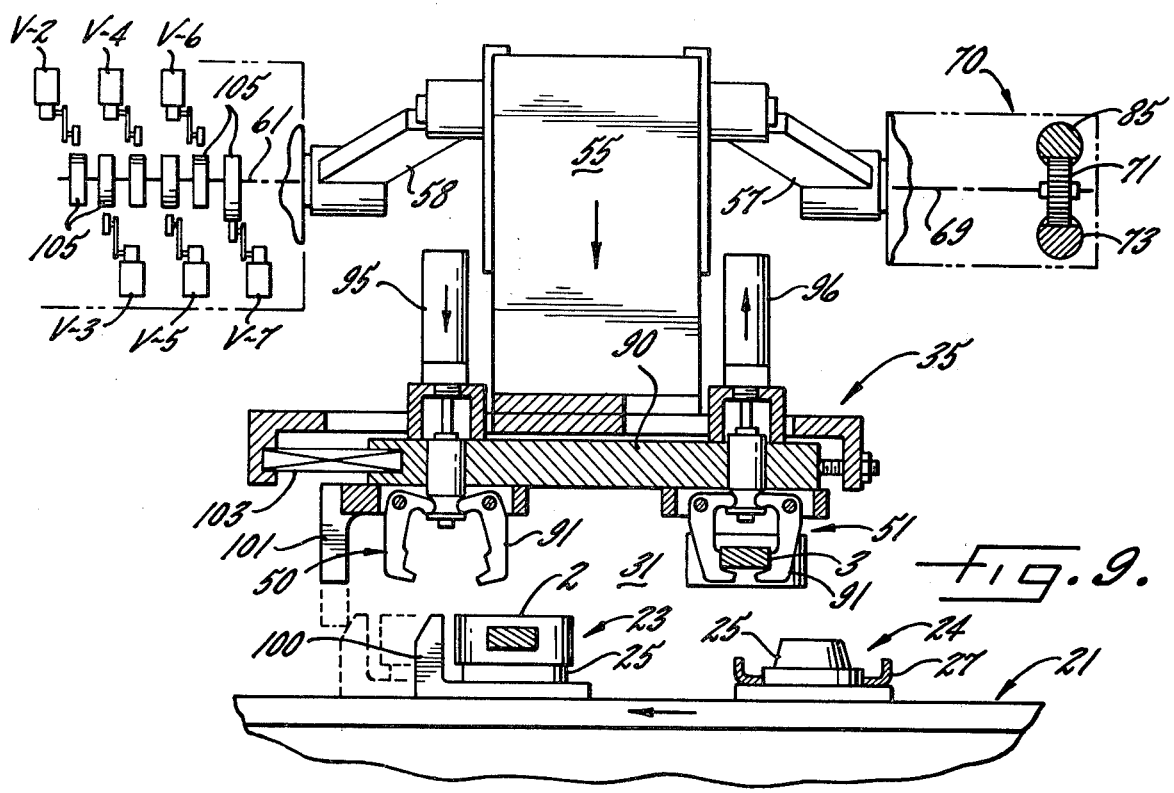
FIG. 9 is an enlarged fragmentary cross-section taken substantially along the line 9—9 of FIG. 1 and shows one position of the transfer mechanism as the latter loads parts onto and unloads parts from the continuously moving table.
Figure 9A:
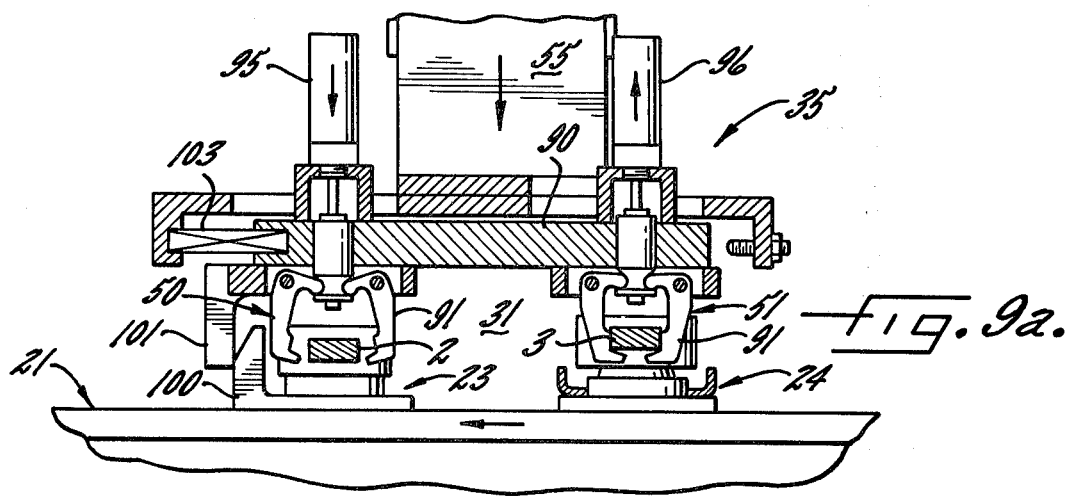
FIGS. 9a, 9b and 9c are views similar to FIG. 9 but show successively moved positions of the transfer mechanism as the latter loads parts onto and unloads parts from the continuously moving table.
Figure 9B:
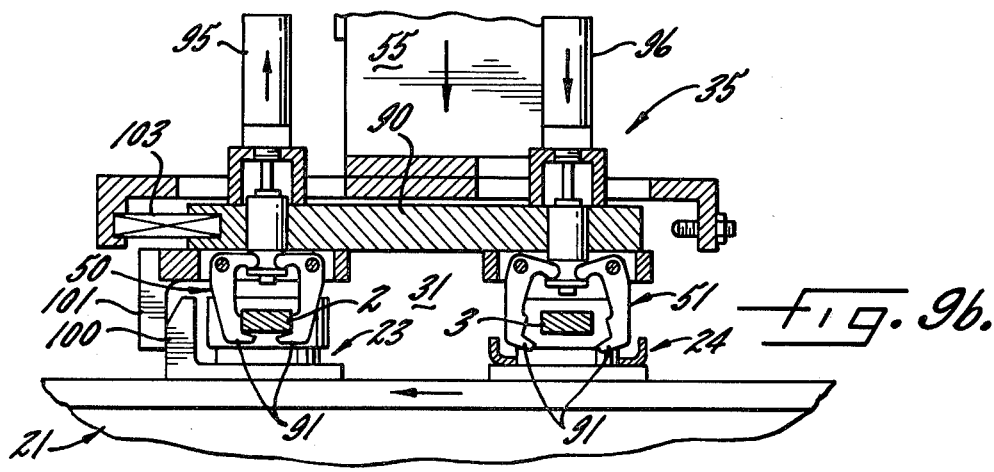

Each time a pair of fixtures 23 and 24 approaches the loading area 31, the head 55 is positioned just above the fixtures as shown in FIG. 9 and, in this position of the head, the jaws 91 of the holder 50 are open and the jaws of the holder 51 are closed and gripping a rod 3. When the dog 86 on the fixture 23 actuates the valve V-1, the plunger 82 is retracted to allow the head to move the holders downwardly toward the fixtures. As the holders move downwardly, an abutment or block 100 (FIGS. 5 and 9) on the fixture 23 drivingly engages a depending arm 101 attached to one end of the slide 90. As a result of such engagement, the slide 90 and the holders 50 and 51 are moved from right to left (see FIG. 9a) relative to the head and horizontally track the fixtures 23 and 24 as the head continues downwardly toward the fixtures. During such combined downward and horizontal movement, the open jaws 91 of the holder 50 move into straddling relationship with the rod 2 in the fixture 23 as shown in FIG. 9a and, at the same time, the holder 51 places the rod 3 in the fixture 24. Thereafter, downward and horizontal movement of the holders continues for a short distance and, during such movement, the actuators 95 and 96 are operated to open the jaws 91 of the holder 51 and to close the jaws of the holder 50 (see FIG. 9b). Thus, the rod 3 is released in the fixture 24 while the rod 2 in the fixture 23 is clamped by the holder 50.

Figure 9C:
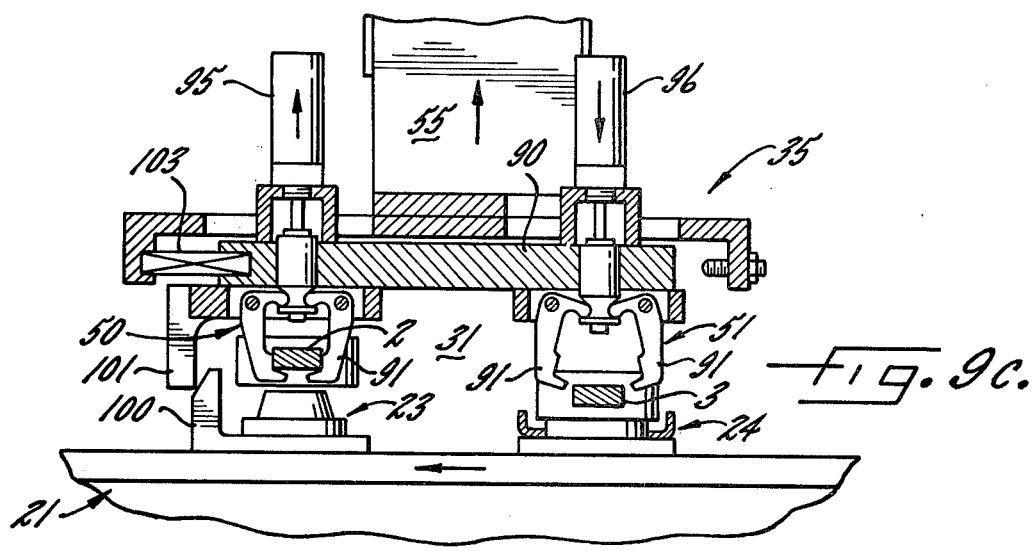

After the actuators 95 and 96 have been operated, the actuator 75 for the head 55 is reversed to shift the holders 50 and 51 upwardly. Accordingly, the rod 3 is left in the fixture 24 while the rod 2 is picked up from the fixture 23 (see FIG. 9c). During initial upward movement of the holders, the block 100 on the fixture 23 remains in engagement with the arm 101 on the slide 90 and continues to move the slide and the holders from right to left as the holders move upwardly from the fixtures. Thus, the holders move horizontally along with the fixtures upon moving upwardly therefrom so that neither the holders nor the picked-up rod 2 collides or interferes with the fixtures. Once the holders have cleared the fixtures, the arm 101 moves upwardly out of engagement with the block 100 and, as an incident thereto, a coil spring 103 (FIGS. 5 and 9) shifts the slide 90 from left to right relative to the head 55 so as to return the slide horizontally to the position shown in FIGS. 9 and 10. One end of the spring acts against the left end of the slide while the other end of the spring bears against a portion of the head.

From the foregoing, it will be apparent that the holders 50 and 51 horizontally track the fixtures 23 and 24 as the fixtures move through the loading area 31 and as the holders make their final downward approach to and their initial upward ascension from the fixtures. Thus the rod 3 is placed into the fixture 24 with a gradual movement to avoid the danger of the rod impacting against the fixture and to reduce the danger of the rod being misalined with the fixture. Also, there is no danger of the holders colliding with the fixtures as the holders move downwardly toward and retract upwardly from the fixtures.

Figure 10:
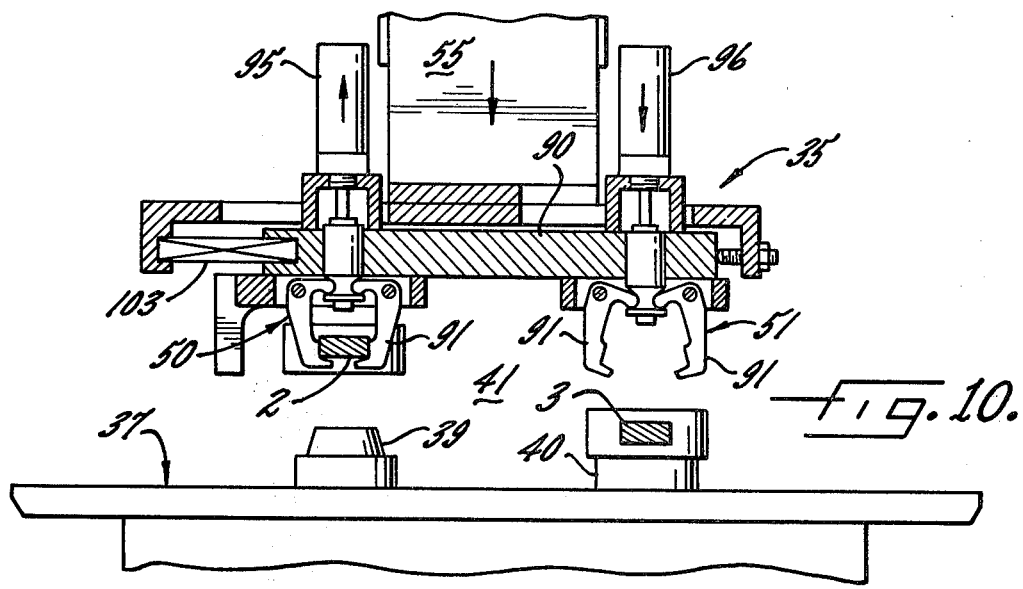
FIG. 10 is an enlarged fragmentary cross-section taken substantially along the line 10—10 of FIG. 1 and shows one position of the transfer mechanism as the latter loads parts onto and unloads parts from the index table.
Figure 10A:
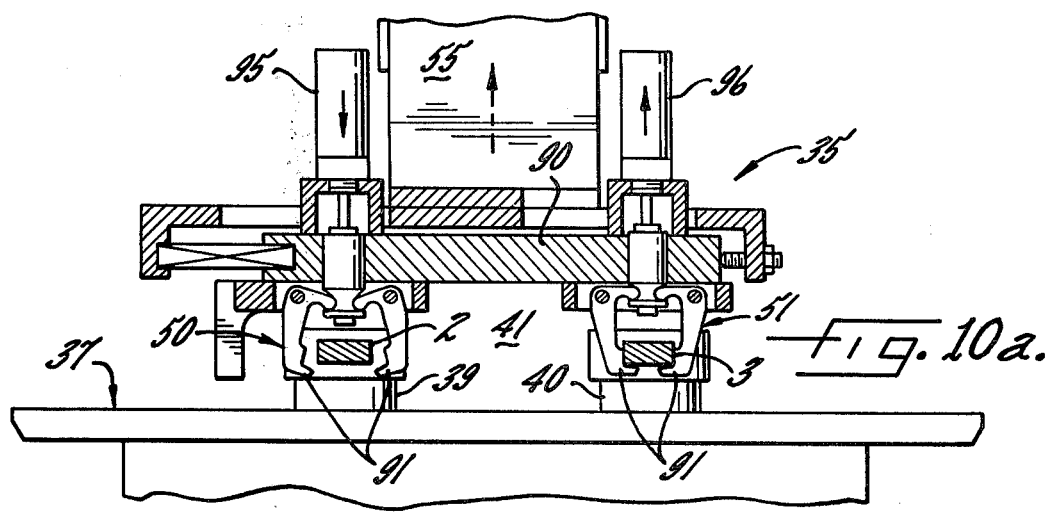
FIG. 10a is a view similar to FIG. 10 but shows the next position of the transfer mechanism as the latter loads parts onto and unloads parts from the index table.

After the holders 50 and 51 have been moved upwardly from the fixtures 23 and 24, the holders are shifted outwardly toward the receiving area 41 by the links 57 to 60 and move to the position shown in FIG. 10. When the index table 37 dwells, the holders are moved downwardly and, during such movement, the holder 50 places the rod 2 on the leading fixture of the pair 39 and 40 dwelling in the receiving area (see FIG. 10a). At the same time, the jaws 91 of the holder 51 move into straddling relationship with the rod 3 on the trailing fixture 40 in the receiving area. Upon continued downward movement of the holders, the actuators 95 and 96 are operated to open the jaws 91 of the holder 50 and to close the jaws of the holder 51. The rod 2 thus is released by the holder 50 while the rod 3 is clamped by the holder 51. Thereafter, the actuator 75 is reversed to cause the holders to move upwardly, the rod 2 thus being left on the fixture 39 and the rod 3 being picked up from the fixture 40 by the holder 51. The head 55 then is moved back toward the loading area 31 so that the rod 3 may be placed in the fixture 24 of the next pair 23 and 24 approaching the loading area and so that the rod 2 in the other fixture 23 of that pair may be picked up.

To control the operation of the actuator 75, the actuators 95 and 96 and the index table 37, six cams 105 (FIG. 9) rotate with the shaft 61 which is associated with the link 58, the cams serving to close and open six control valves V-2 to V-7 which are respectively associated with the cams. As mentioned above, the plunger 82 is extended and stops the holders 50 and 51 in position above the loading area 31 until the fixture 23 moves into the loading area and causes the dog 86 to actuate the valve V-1. During this time, the index table 37 is indexing to bring a rod 3 into the receiving area 41. When the valve V-1 is actuated, the signal produced thereby effects retraction of the plunger 82 to enable the head 55 to move downwardly toward the loading area, that signal also effecting extension of the plunger 81. During downward movement of the head, one of the cams 105 actuates the valve V-2 to effect operation of the actuators 95 and 96 so as to close the jaws 91 of the holder 50 and open the jaws of the holder 51. With continued downward movement of the head 55, one of the cams actuates the valve V-3 to reverse the actuator 75 and initiate upward movement of the head. The valves V-1, V-2 and V-3 are released idly as the head moves upwardly and as the dog 86 on the fixture 23 moves away from the valve V-1.

When the index table 37 completes its index, the valve which is associated with the table is released and effects retraction of the plunger 81 so that the head 55 may proceed downwardly toward the index table. During downward movement of the head, one of the cams 105 actuates the valve V-4 and the signal produced thereby effects extension of the plunger 82. Such signal also causes the actuators 95 and 96 to be operated to open the jaws 91 of the holder 50 and to close the jaws of the holder 51. As the head 55 continues downwardly toward the index table, a cam actuates the valve V-5 to reverse the actuator 75 and to cause the head to begin shifting upwardly and inwardly. During such movement, the valves V-4 and V-5 are released idly by their cams while another cam actuates the valve V-6 to cause the index table to begin indexing through another step. As the table indexes, the valve which is associated with the table is actuated idly.

When the head 55 reaches the position where movement of the head is momentarily stopped by the plunger 82, the valve V-6 is actuated by its cam 105. If the latter valve is not actuated before the dog 86 on the fixture 23 actuates the valve V-1, the grinding table 21 will stop, the plunger 82 will re-extend and the plunger 81 will extend. In other words, the grinding table 21 and the transfer mechanism 35 will be shut down automatically if the circumstances are such that the head 55 would be late in arriving at the loading area 31. Other safety interlocks may be provided to stop the grinding table and the transfer mechanism if the holders 50 and 51 fail to either pick up or release the rods 2 and 3, respectively, or if the slide 90 is in either an improper horizontal position or an improper vertical position while in the loading area.

Before describing the construction and operation of the turn over mechanism 36, it should be pointed out that the loading mechanism 30 (FIG. 1) may be a mechanism which is identical to the transfer mechanism with the exception that the loading mechanism requires only a single rod holder rather than two holders 50 and 51. The loading mechanism may be associated with an index table 106 which receives rods 1 in any suitable manner. Each time the table 106 dwells, the loading mechanism picks up a rod 1 from the table and delivers such rod to one of the fixtures 23 of the grinding table 21. The loading mechanism then returns to the index table 106 to pick up the next rod 1.

The Turn Over Mechanism

As mentioned above, the turn over mechanism 36 picks up a rod 2 from the leading fixture 39 of each pair dwelling in the turning area 44 and places a turned-over rod 3 on the trailing fixture 39. When the table 37 indexes, the turn over mechanism turns over the picked-up rod preparatory to placing the rod on the trailing fixture of the next pair.

In the present instance, the turn over mechanism 36 includes first and second holders 110 and 111 (FIG. 7) adapted to pick up and release the rods. Each holder includes a pair of jaws 113 which are pivotally mounted at 114 on a head 115 to move between open and closed positions. Compression springs 116 act between the head 115 and ears 117 on each of the jaws to bias the latter toward open positions. The ears of each pair of jaws 113 also fit into a groove formed around a spool 119 which is attached to a rod 120. The latter extends outwardly through the head 115 and carries a collar 121 on its outer end. A coil spring 122 is compressed between the collar and the head and urges the rod 120 outwardly so as to swing the jaws to their closed positions. The force exerted by the spring 122 of each holder 110, 111 is greater than the combined force exerted by the two springs 116 of the holder and thus the jaws 113 of the holder normally are held in their closed positions by the spring 122.

The head 115 is keyed to a shaft 125 (FIG. 7) which is rotatably supported on a platform 126 located outwardly of the head 115 and mounted on the base 66. Also supported on the platform are two pneumatic actuators 127 and 128 having rods 129 adapted to be shifted inwardly and outwardly. Each time one of the rods 129 is shifted inwardly, it moves into abutting engagement with the outer end of the rod 120 of one of the holders 110 and 111 and shifts the latter rod inwardly so that the springs 116 may shift the jaws 113 of the holder to their open position. When the rod 129 is retracted away from the rod 120, the spring 122 shifts the rod 120 outwardly and effects closing of the jaws.

In order to turn the rods over, the shaft 125, the head 115 and the holders 110 and 111 are adapted to be rotated back and forth through an arc of 180° about the axis of the shaft, such axis being symmetrically located with respect to the holders. For this purpose, a rotary pneumatic motor 130 (FIG. 7) is supported on the outer end portion of the platform 126 and its drive shaft 131 is operably connected to the shaft 125. When the motor is first actuated, the shaft 125 is rotated clockwise (FIG. 11) through one-half revolution and then is stopped by virtue of a dog 133 (FIG. 8) on the shaft actuating a control valve V-8 to stop the motor. When the motor is next actuated, the shaft 125 is turned in the reverse direction through the same distance and is stopped when the dog actuates another control valve V-9. Each time the shaft is rotated, both holders 110 and 111 are turned over and switch positions so that each occupies the space formerly occupied by the other.

Figure 11:
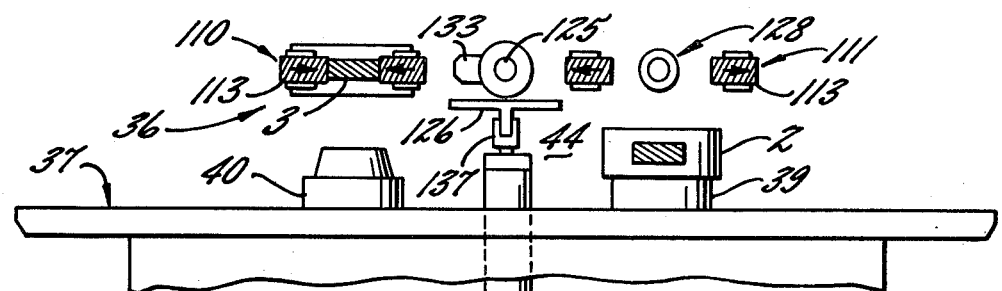
FIG. 11 is an enlarged fragmentary cross-section taken substantially along the line 11—11 of FIG. 1 and shows one position of the turn over mechanism.
Figure 11A:
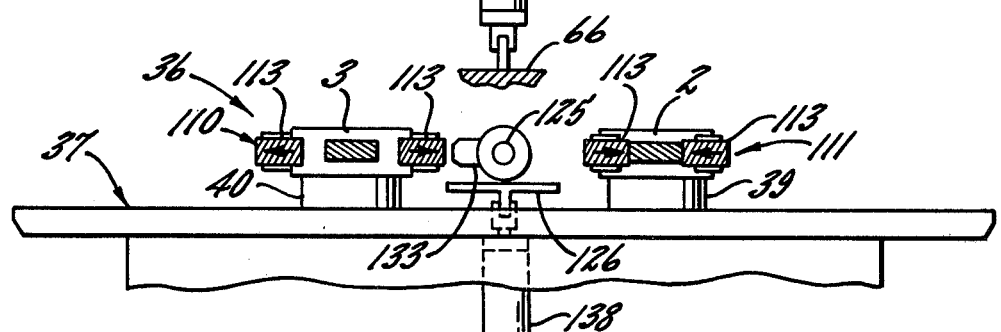
FIGS. 11a to 11e are views similar to FIG. 11 but show successively moved positions of the turn over mechanism.
Figure 11B:
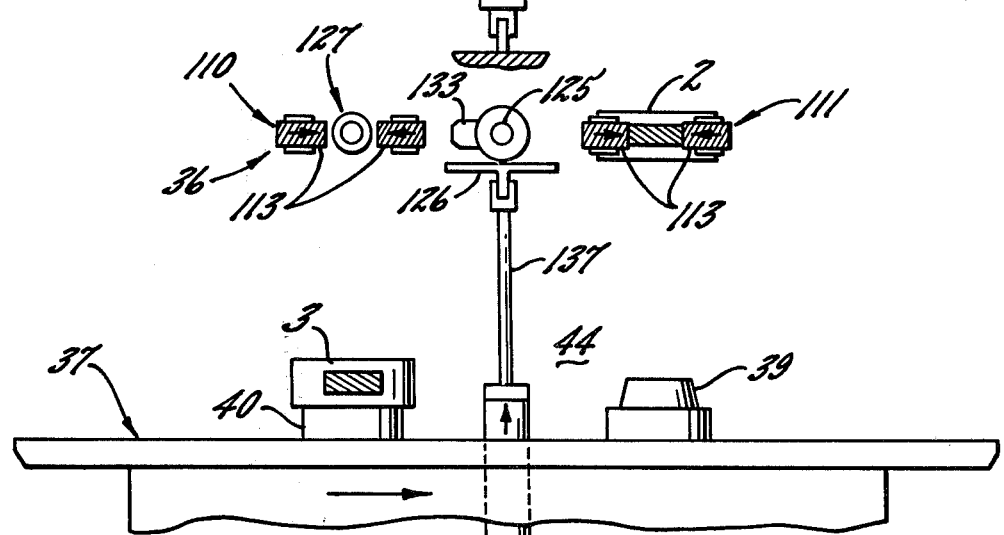

To enable the holders 110 and 111 to remove the rods 2 from and place the rods 3 on the fixtures 39 and 40, the holders are adapted to be moved between raised and lowered positions. This is achieved by mounting the platform 126 for up and down swinging, the outer end portion of the platform being connected rigidly to a horizontal shaft 135 (FIGS. 6 and 7) whose end portions are rotatably journaled by bearings 136 on the base 66. The rod 137 (FIG. 6) of a pneumatic actuator 138 is connected to the underside of the inner end portion of the platform 126 and that actuator, in turn, is connected to the rod 139 (FIG. 11) of a second pneumatic actuator 140 whose lower end is connected to the base 66. When the rods of both actuators 138 and 140 are retracted, the holders 110 and 111 are held in a lowered position as shown in full lines in FIG. 6 and are disposed approximately at the same level as the fixtures 39 and 40 in the turning area 44. When the rod 139 of the lower actuator 140 is extended, the holders are swung upwardly to an intermediate position spaced just above the fixtures as shown in FIG. 11 and in dash-dot lines in FIG. 6. Upon subsequent extension of the rod 137 of the upper actuator 138, the holders are swung upwardly to a fully raised position (as shown in FIG. 11b and by dotted lines in FIG. 6) and are spaced well above the fixtures.

In order to explain the operation of the turn over mechanism 36, let it be assumed that the index table 37 is indexing, that the holders 110 and 111 are disposed in their intermediate position, that a previously turned-over rod 3 is held in the closed jaws 113 of the holder 110 and that the jaws of the holder 111 are open (see FIG. 11). When the fixtures 39 and 40 move beneath the holders 111 and 110, respectively, and stop, the previously mentioned control valve associated with the index table is released and causes the rod 139 of the lower actuator 140 to retract so as to swing the holders downwardly to their lowered positions (see FIG. 11a). The holder 110 thus places its rod 3 on the trailing fixture 40 of the pair in the turning area while the open jaws 113 of the holder 111 move into straddling relationship with the rod 2 on the leading fixture 39 of the pair.

When the holders 110 and 111 reach their lowered position, the platform 126 actuates a control valve V-10 (FIG. 3) which causes the actuators 127 and 128 to operate so as to extend the rod 129 of the actuator 127 and to retract the rod 129 of the actuator 128. Accordingly, the rod 129 of the actuator 127 causes the jaws 113 of the holder 110 to open so as to release the rod 3 to the fixture 40. At the same time, the rod 129 of the actuator 128 allows the jaws of the holder 111 to close and clamp the rod 2 on the fixture 39 (see FIG. 11a). As the rod 129 of the actuator 127 reaches its fully extended position, the pressure in the rod end of that actuator falls to a low value and results in a signal which operates both of the actuators 138 and 140 simultaneously to extend the rods 137 and 139 of both actuators. Thus, the platform 126 is swung upwardly to move the holders 110 and 111 to their fully raised positions, the rod 2 moving upwardly with the holder 111 while the rod 3 is left on the fixture 40 by the holder 110 (see FIG. 11b). As the platform swings upwardly, the valve V-10 is released idly.

As soon as the holders 110 and 111 reach their fully raised position, a control valve V-11 (FIG. 3) is closed by the platform 126 and effects retraction of the rod 129 of the actuator 127 so that the jaws 113 of the empty holder 110 close. At the same time, the index table 37 begins indexing, providing that the head 55 of the transfer mechanism 35 has reached the point where the control valve V-6 has been actuated by its cam 105. As the table indexes, the control valve associated with the table is actuated idly.

Figure 11C:
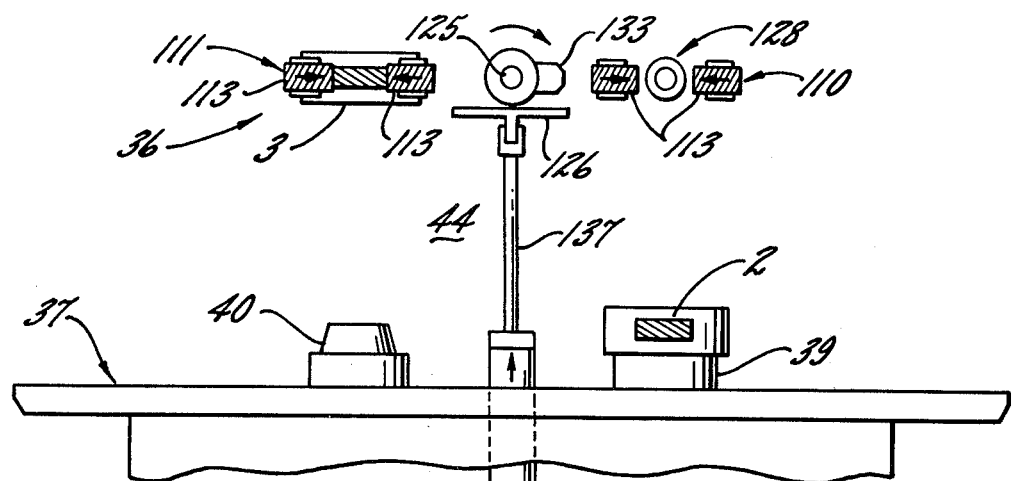

When the rod 129 of the actuator 127 reaches its fully retracted position, the pressure in the head end of the actuator falls to a low value and results in a signal which causes the turning motor 130 to rotate the shaft 125 in a clockwise direction. Accordingly, the head 115 and the holders 110 and 111 are turned clockwise through one-half revolution so that the two holders are turned over and switch positions with one another (see FIG. 11c). During such turning, the rod 2 in the holder 111 becomes a turned-over rod 3 and is placed in a position located above the position to be occupied by the trailing fixture 40 of the next pair of fixtures to dwell in the turning area 44. Because the holders are in their fully raised positions during the turning, the holders do not interfere or collide with the index table.

When the shaft 125 is turned, the dog 133 releases the valve V-9 idly and then actuates the valve V-8 to stop the motor 130 after the shaft has rotated through one-half revolution. When the valve V-8 is actuated, the actuator 128 is operated to extend its rod 129. This rod now engages the rod 120 of the empty holder 110 and causes the jaws 113 of that holder to open preparatory to the holder moving downwardly and picking up a rod 2 (see FIG. 11d). The jaws of the loaded holder 111 remain closed because the rod 129 of the actuator 127 previously was retracted and thus is located in outwardly spaced relation from the rod 120 of the holder.

Figure 11D:
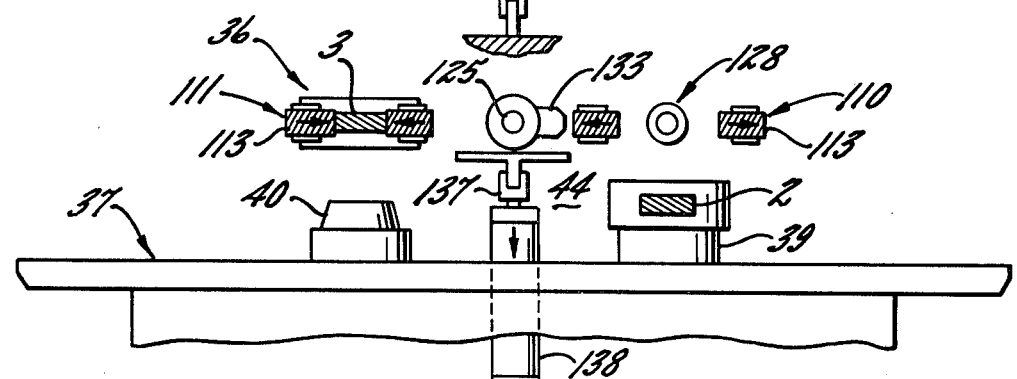

Actuation of the valve V-8 also causes the lower actuator 138 to retract its rod 137 and lower the holders 110 and 111 to their intermediate position just above the index table 37 (see FIG. 11d). As the holders are lowered, the control valve V-11 is released idly.

Figure 11E:
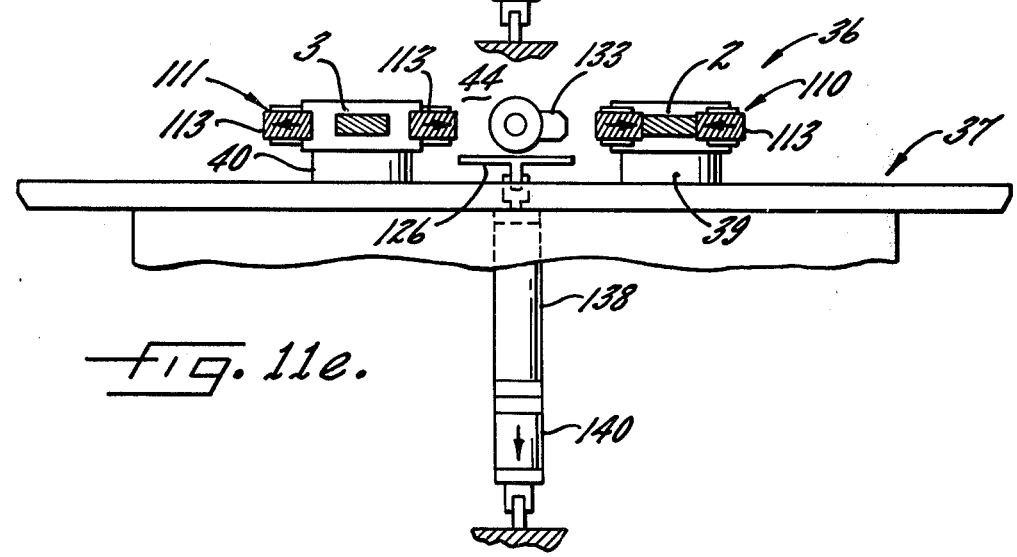

A half-cycle of operation is completed when the holders 110 and 111 reach their intermediate position shown in FIG. 11d. At the end of the half-cycle, the various parts of the turn over mechanism 36 are located in exactly the same positions that they occupied at the start of the cycle (see FIG. 11) except that the holders 110 and 111 have switched positions with one another and the turned-over rod 3 now is held in the holder 111 rather than in the holder 110. When the index table 37 next dwells to start the second half-cycle, the holders move downwardly to their lowered position to enable the jaws 113 of the holder 110 to clamp the rod 2 on the leading fixture 39 and to enable the jaws of the holder 111 to release the rod 3 to the trailing fixture 40 (see FIG. 11e). During this half-cycle, however, the jaws 113 of the holder 110 are allowed to close by virtue of the rod 129 of the actuator 128 being moved to its retracted position while the jaws of the holder 111 are opened when the rod 129 of the actuator 127 is moved to its extended position.

As the second half-cycle continues, the holders 110 and 111 are moved upwardly to their raised positions and then are turned over and switched back to their original positions. During such turning, however, the holders are rotated counterclockwise rather than clockwise as in the first half-cycle. As the shaft 125 turns, the dog 133 first releases the valve V-8 idly and then actuates the valve V-8 to stop the motor 130 after the shaft has rotated precisely through one-half revolution. The second half-cycle then proceeds as described previously in connection with the first half-cycle, the entire cycle being completed when the holders are lowered back to their intermediate position shown in FIG. 11.

To summarize, a first one of the holders 110 and 111 of the turn over mechanism 36 places a rod 3 on a fixture 40 while the second one of the holders picks up a rod 2 from a fixture 39. The holders then are moved to their raised position to clear the index table 37 and are turned over in one direction while the table is indexing. Upon being lowered to their intermediate position, the holders wait for the index table to dwell and then move downwardly to the table to enable the second holder to place the rod 3 on the next fixture 40 while the first holder picks up a rod 2 from the next fixture 39. After again being raised, the holders are turned over in the reverse direction and then are lowered so that the first holder again places a rod 3 while the second holder again picks up a rod 2. Thus, the holders 110 and 111 alternate with one another in picking up and placing rods. Since the holders in effect "share" the two actuators 127 and 128, the jaws 113 of the holders may be opened and closed at the appropriate times without need of encumbering the rotatable head 115 with actuators for the jaws.

We claim:

1. Parts handling apparatus comprising a table disposed in a generally horizontal plane and having a series of part carriers spaced angularly around its upper side, means for continuously rotating said table about an upright axis, and transfer mechanism for picking up a part at a receiving area spaced horizontally outwardly from said table and for releasing said part to one of said carriers as said table rotates and moves said one carrier through a loading area, said transfer mechanism comprising a head having a part holder which is operable to pick up and release a part, means supporting said head for movement between first and second positions, said part holder picking up a part at said receiving area when said head is in said second position and moving said part inwardly and downwardly toward said table as said head moves toward said first position, means mounting said part holder on said head for horizontal movement relative to the head and along the same general path followed by said one carrier as the latter moves through said loading area, and means for moving said part holder horizontally relative to said head as said one carrier moves through said loading area and as said head moves downwardly into said first position whereby said part holder horizontally tracks said one carrier and releases said part to said carrier during such tracking.

2. Parts handling apparatus as defined in claim 1 in which said means for mounting said part holder comprise a slide supported on said head for horizontal movement relative to said head, said means for moving said part holder comprising an abutment associated with said one part carrier and engageable with said slide as said one carrier moves through said loading area, the engagement of said abutment with said slide serving to move said slide and said part holder horizontally in one direction relative to said head as the latter moves downwardly into said loading area.

3. Parts handling apparatus as defined in claim 2 further including means acting between said head and said slide and biasing the slide horizontally in the opposite direction relative to said head, said biasing means returning said slide horizontally in said opposite direction after said head has moved a predetermined distance from said first position toward said second position.

4. Parts handling apparatus as defined in claim 1 in which said means for supporting said head comprise a parallelogram linkage operable to constrain said head to movement in a substantially vertical arc as said head moves between said first and second positions, said linkage being effective to keep said head oriented in substantially the same position during movement of the head, and means for oscillating said linkage back and forth thereby to move said head back and forth between said first and second positions.

5. Parts handling apparatus as defined in claim 4 further including means for momentarily stopping said head short of said first position as said head approaches said first position, and means for releasing said stopping means when said one carrier reaches a predetermined position in said loading area, said head proceeding toward said first position when said stopping means are released.

6. Parts handling apparatus comprising a table disposed in a generally horizontal plane and having a series of part carriers spaced angularly around its upper side, means for continuously rotating said table about an upright axis, and transfer mechanism for (a) picking up a part from one of said carriers as said table rotates and moves said one carrier through an unloading area and (b) for releasing said part at a receiving area spaced horizontally outwardly from said table, said transfer mechanism comprising a head having a part holder which is operable to pick up and release a part, means supporting said head for movement between first and second positions, said part holder picking up a part at said unloading area when said head is in said first position and moving said part upwardly and outwardly from said table as said head moves toward said second position, means mounting said part holder on said head for horizontal movement relative to the head and along the same general path followed by said one carrier as the latter moves through said unloading area, and means for moving said part holder horizontally in one direction relative to said head as said one carrier moves through said unloading area and during final movement of said head into and initial movement of said head out of said first position whereby said part holder horizontally tracks said one carrier while moving into position to pick up said part from said carrier and while moving upwardly with the picked-up part.

7. Parts handling apparatus as defined in claim 6 in which said means for mounting said part holder comprise a slide supported on said head for horizontal movement relative to said head, said means for moving said part holder comprising an abutment associated with said one part carrier and engageable with said slide as said one carrier moves through said loading area and during final movement of said head into and initial movement of said head out of said first position, the engagement of said abutment with said slide serving to move said slide and said part holder horizontally in said one direction relative to said head.

8. Parts handling apparatus comprising a table disposed in a generally horizontal plane and having a series of part carriers spaced angularly around its upper side, means for continuously rotating said table about an upright axis, and transfer mechanism for (a) picking up a first part from a first one of said carriers as said table rotates and moves said first carrier through a loading area and (b) releasing said first part at a receiving area spaced horizontally outwardly from said table, said transfer mechanism also being operable to pick up a second part at said receiving area and to release said second part to a second one of said carriers as said table rotates and moves said second carrier through said loading area, said transfer mechanism comprising a head having first and second part holders disposed in side-by-side relation and operable to pick up and release said first and second parts, respectively, means supporting said head for movement between first and second positions, said first part holder picking up said first part from said first carrier when said head is in said first position and moving said first part upwardly and outwardly from said table as said head moves toward said second position, said second part holder picking up said second part from said receiving area when said head is in said second position and moving said second part inwardly and downwardly toward said table as said head moves toward said first position, means mounting said part holders on said head for horizontal movement relative to the head and along the same general path followed by said part carriers as the latter move through said loading area, and means for moving said part holders horizontally relative to said head as said first and second carriers move through said loading area and during final movement of said head into and initial movement of said head out of said first position whereby said first part holder horizontally tracks said first carrier and picks up said first part from the first carrier while said second part holder horizontally tracks said second carrier and releases said second part to the second carrier.

9. Parts handling apparatus as defined in claim 8 in which said means for supporting said head comprise a parallelogram linkage operable to constrain said head to movement in a substantially vertical arc as said head moves between said first and second positions, said linkage being effective to keep said head oriented in substantially the same position during movement of the head, and means for oscillating said linkage back and forth thereby to move said head back and forth between said first and second positions.

10. Parts handling apparatus as defined in claim 9 further including means for momentarily stopping said head short of said first position as said head approaches said first position, and means for releasing said stopping means when said first and second carriers reach a predetermined position in said loading area, said head proceeding toward said first position when said stopping means are released.

11. Parts handling apparatus as defined in claim 8 in which each of said part holders comprise a pair of jaws adapted to be opened and closed, a first actuator for closing the jaws of said first part holder each time said head is in said first position and for opening the jaws of said first part holder each time said head is in said second position, and a second actuator for opening the jaws of said second part holder each time said head is in said first position and for closing the jaws of said second part holder each time said head is in said second position.

12. Parts handling apparatus as defined in claim 11 in which said means for mounting said part holders comprise a slide mounted on said head for horizontal movement relative to said head, said actuators also being mounted on said slide and moving horizontally in unison with said part holders when said slide is shifted relative to said head.

13. Parts handling apparatus comprising first and second horizontally spaced tables each having a series of part carriers spaced angularly around its upper side, means for rotating each table about an upright axis, transfer mechanism mounted to shuttle back and forth along a path extending between the tables, said transfer mechanism being operable to pick up a first part from a first one of said carriers on said first table and to release said first part to a first one of said carriers on said second table, said transfer mechanism also being operable to pick up a second part from a second one of said carriers on said second table and to release said second part to a second one of said carriers on said first table, said transfer mechanism releasing one part at about the same time the transfer mechanism picks up another part, turn over mechanism located adjacent said second table, said turn over mechanism being operable to pick up a part placed on said second table by said transfer mechanism, re-orient such part and then replace the re-oriented part on said second table whereby the re-oriented part may be subsequently picked up by said transfer mechanism and returned to said first table.

14. Parts handling apparatus as defined in claim 13 in which said transfer mechanism comprises a head mounted for movement between a first position located adjacent said first table and a second position located adjacent said second table, first and second part holders mounted in side-by-side relation on said head, said first part holder being operable to pick up said first part from said first carrier on said first table when said head is in said first position and to release said first part to said first carrier on said second table when said head is in said second position, said second part holder being operable to pick up said second part from said second carrier on said second table when said head is in said second position and to release said second part to said second carrier on said first table when said head is in said first position.

15. Parts handling apparatus as defined in claim 14 in which said turn over mechanism includes a head supported for movement between raised and lowered positions, means mounting the head of said turn over mechanism for turning about a predetermined axis, said turn over mechanism further including first and second part holders disposed in side-by-side relation on the head of said turn over mechanism and located symmetrically with respect to said axis, and means for turning the head of said turn over mechanism through one-half revolution each time such head is in said raised position thereby to turn over each of the holders of the turn over mechanism and to cause such holders to switch positions with one another.

16. Parts handling apparatus as defined in claim 15 in which each of the holders of said turn over mechanism includes first and second jaws adapted to open and close, means for opening the jaws of one of the holders of said turn over mechanism and for closing the jaws of the other holder of said turn over mechanism every other time the head of said turn over mechanism is in said lowered position, said means closing the jaws of said one holder of said turn over mechanism and opening the jaws of said other holder of said turn over mechanism each intervening time said head of said turn over mechanism is in said lowered position.

17. Parts handling apparatus comprising first and second horizontally spaced tables each having a series of part carriers spaced angularly around its upper side, means for rotating said first table continuously about an upright axis, means for rotating said second table intermittently about an upright axis to index each of the carriers on the second table between a receiving area and a turning area, one pair of carriers on the second table dwelling in said receiving area while another pair of carriers on the second table is dwelling in said turning area, transfer mechanism for (a) picking up a first part from a first one of said carriers on said first table as said first table rotates and moves said first carrier through a loading area spaced horizontally inwardly from said receiving area and (b) delivering said first part to one carrier of a pair dwelling in said receiving area, said transfer mechanism also being operable to pick up a second part from the other carrier of the pair dwelling in said receiving area and to deliver such part to a second one of the carriers on said first table as the first table rotates and moves said second carrier through said loading area, said transfer mechanism comprising a head having first and second part holders which are operable to pick up and release said first and second parts, respectively, means mounting said head for movement between first and second positions, said first part holder picking up said first part from said first carrier when said head is in said first position and moving said first part upwardly and outwardly from said first table as said head moves toward said second position, said second part holder picking up said second part from said receiving area when said head is in said second position and moving said second part inwardly and downwardly toward said first table as said head moves toward said first position, means mounting said part holders on said head for horizontal movement relative to the head and along the same general path followed by said first and second part carriers as the latter move through said loading area, means for moving said part holders relative to said head as said first and second carriers move through said loading area and during final movement of said head into and initial movement of said head out of said first position whereby said first part holder horizontally tracks said first carrier and picks up said first part from the first carrier while said second part holder horizontally tracks said second carrier and releases said second part to the second carrier, said first part holder releasing said first part to a carrier dwelling in said receiving area when said head reaches said second position, turn over mechanism located adjacent said second table, said turn over mechanism being operable to pick up the part released to the carrier in said receiving area by said first part holder after said part has been indexed from said receiving area to said turning area, said turn over mechanism thereafter being operable to re-orient the picked-up part and to replace the re-oriented part on a carrier dwelling in said turning area whereby the re-oriented part may be picked up by said second part holder and returned to said first table after the re-oriented part has been indexed from said turning area to said receiving area by said second table.

18. Parts handling apparatus comprising a table having angularly spaced pairs of angularly spaced parts carriers on its upper side, means for rotating said table intermittently about an upright axis to index each pair of carriers from a receiving area to a turning area and then back to said receiving area, one pair of said carriers dwelling in said receiving area while another pair of said carriers is dwelling in said turning area, mechanism for placing a first part on a first carrier of each pair and for picking up another part from the second carrier of such pair when such pair dwells in said receiving area, said first carrier and said first part being moved into said turning area when said table is indexed, turn over mechanism located adjacent said turning area and having first and second part holders disposed in side-by-side relation and operable to pick up and release parts, said part holders being movable between raised and lowered positions and being disposed in said raised position as said first part is indexed into said turning area, said first part holder being empty and there being a second part in said second holder when said part holders are in said raised position, means (a) for moving said part holders from said raised position to said lowered position and then back to said raised position while said table is dwelling and (b) for causing said first part holder to pick up said first part from the first carrier in said turning area and for causing said second part holder to place said second part on the second carrier of the pair in the turning area during movement of said part holders, means for turning said part holders about an axis located symmetrically with respect to the part holders and through one-half revolution when said part holders are returned back to said raised position and while said table is indexing whereby said first part is turned over and said part holders switch positions with one another, said part holders then being moved to said lowered position when said table dwells whereby said first part holder places the turned-over first part on the second carrier of the pair then dwelling in the turning area while the second part holder moves into position to pick up the part from the first carrier of such pair.

19. Parts handling apparatus as defined in claim 18 in which said turn over mechanism includes a support, a head mounted on said support to turn about said axis, said holders being mounted on said head and each comprising a pair of jaws adapted to open and close, said support being mounted for vertical movement and mounting said holders for movement between said raised and lowered positions, first and second actuators mounted on said support to move vertically therewith, said head and said holders being rotatable relative to said actuators, said first actuator being operable to open the jaws of said first holder every other time said holders are in said lowered position and to open the jaws of said second holder every intervening time said holders are in said lowered position, said second actuator being operable to close the jaws of said second holder every other time said holders are in said lowered position and to close the jaws of said first holder every intervening time said holders are in said lowered position.

* * * * *